(12) United States Patent
Ochiai et al.

(10) Patent No.: US 7,824,159 B2
(45) Date of Patent: Nov. 2, 2010

(54) COMPRESSOR, TITANIUM-MADE ROTOR BLADE, JET ENGINE AND TITANIUM-MADE ROTOR BLADE PRODUCING METHOD

(75) Inventors: Hiroyuki Ochiai, Koto-ku (JP);
Mitsutoshi Watanabe, Koto-ku (JP);
Akihiro Goto, Chiyoda-ku (JP); Masao Akiyoshi, Chiyoda-ku (JP)

(73) Assignees: Ishikawajima-Harima Heavy Industries Co., Ltd., Tokyo (JP);
Mitsubishi Denki Kabushiki Kaisha, Tokyo (JP)

( * ) Notice: Subject to any disclaimer, the term of this patent is extended or adjusted under 35 U.S.C. 154(b) by 941 days.

(21) Appl. No.: 10/586,306

(22) PCT Filed: Jan. 14, 2005

(86) PCT No.: PCT/JP2005/000410

§ 371 (c)(1),
(2), (4) Date: Feb. 5, 2007

(87) PCT Pub. No.: WO2005/068845

PCT Pub. Date: Jul. 28, 2005

(65) Prior Publication Data
US 2007/0160469 A1      Jul. 12, 2007

(30) Foreign Application Priority Data
Jan. 14, 2004    (JP)    ............ P2004-007282

(51) Int. Cl.
*F01D 5/14*    (2006.01)

(52) U.S. Cl. ............... 416/241 R; 415/173.4; 206/110; 427/578; 427/576; 427/577; 427/580; 219/69.17; 219/76.13; 29/889.7

(58) Field of Classification Search .............. 415/173.4, 415/174.4; 416/241 R, 241 B, 241 A; 205/110
See application file for complete search history.

(56) References Cited

U.S. PATENT DOCUMENTS

| | | | | |
|---|---|---|---|---|
| 5,704,759 | A | * | 1/1998 | Draskovich et al. ...... 415/170.1 |
| 6,190,124 | B1 | * | 2/2001 | Freling et al. ............ 415/173.4 |

FOREIGN PATENT DOCUMENTS

| | | |
|---|---|---|
| JP | 56 9258 | 2/1981 |
| JP | 1 60680 | 12/1989 |
| JP | 05 148615 | 6/1993 |
| JP | 8 26367 | 3/1996 |
| JP | 09 192937 | 7/1997 |

(Continued)

*Primary Examiner*—Edward Look
*Assistant Examiner*—Ryan H Ellis
(74) *Attorney, Agent, or Firm*—Oblon, Spivak, McClelland, Maier & Neustadt, L.L.P.

(57) ABSTRACT

What disclosed is to form an abrasive coating having abrasiveness at a blade pressure side of a deposition layer using a second electrode composed of a second molded body molded from a mixed powder including a powder of a metal and a powder of a ceramic or the second electrode processed with a heat treatment, generating pulsing electric discharges between the blade pressure side of the deposition layer and the second electrode in an electrically insulating liquid or gas, and welding a material of the second electrode or a reacting substance of the material of the second electrode on the blade pressure side of the deposition layer by means of energy of the electric discharges.

16 Claims, 8 Drawing Sheets

FOREIGN PATENT DOCUMENTS

| | | |
|---|---|---|
| JP | 10 030404 | 2/1998 |
| JP | 2003 269398 | 9/2003 |
| JP | 2004 150272 | 5/2004 |
| JP | 2005 002882 | 1/2005 |
| WO | 01 55481 | 8/2001 |

* cited by examiner

THICKNESS OF FUSED PORTION ($\mu$m)

THICKNESS OF FUSED PORTION ($\mu$m)

COMPRESSOR, TITANIUM-MADE ROTOR BLADE, JET ENGINE AND TITANIUM-MADE ROTOR BLADE PRODUCING METHOD

TECHNICAL FIELD

The present invention relates to a compressor, a titanium rotor blade, a jet engine, and a production method for a titanium rotor blade.

BACKGROUND ART

To promote weight saving of jet engines, a titanium compressor case and titanium rotor blades, both of which are composed of titanium alloys, are applied to compressors of the jet engines.

On the other hand, for prevention of titanium fire caused by mutual friction between an internal surface of the titanium compressor case and a tip end portion of the titanium rotor blade, by using a soft material such as Ni-graphite as a spraying material, a porous abradable coating having abradability is formed on the internal surface of the titanium compressor case by spraying. Here, the term "abradability" means a quality of being abraded with respect to a member where the member is abraded by an opposite member having relation of mutual friction with the member, and the abradable coating is easily abraded by the rotor blades having relation of mutual friction.

DISCLOSURE OF INVENTION

Meanwhile, since the abradable coating is porous, air resistance in the titanium compressor case becomes larger and there comes to be a problem that it gives rise to reduction in compression efficiency of the compressor.

Further, since the abradable coating is formed by spraying, adhesiveness of the abradable coating with respect to the titanium compressor case is inferior and hence there is a problem that the abradable coating is easy to peel off from the internal surface of the titanium compressor case. Furthermore, for the same reason, a blasting treatment before forming the abradable coating, pretreatments such as an adhering treatment of a masking tape, and post-treatments such as a removal treatment of the masking tape after formation of the abradable coating are respectively required. Therefore, the number of steps required for production of the compressor is increased and hence there is a problem that improvement of working efficiency could not be easily achieved.

Then, a first feature of the present invention is that, in a compressor for compressing air applied to a jet engine, the compressor is provided with: a titanium compressor case composed of a titanium alloy; a compressor rotor arranged inside the compressor case, the compressor rotor including plural titanium rotor blades at even intervals and being rotatable around a case axial center of the titanium compressor case, wherein, instead of having an abradable coating formed on an internal surface of the titanium compressor case, each of the titanium rotor blades includes; a rotor blade main body composed of a titanium alloy; a deposition layer formed at a tip end portion of the rotor blade main body, the deposition layer being formed by using a first electrode composed of a first molded body molded from a powder of a cobalt-chromium alloy or a nickel alloy, or the first molded body processed with a heat treatment, generating pulsing electric discharges between the tip end portion of the rotor blade main body and the first electrode in an electrically insulating liquid or gas, and welding a material of the first electrode or a reacting substance of the material of the first electrode on the tip end portion of the blade main body by means of energy of the electric discharges; and an abrasive coating having abrasiveness formed at a blade pressure side of the deposition layer, the abrasive coating being formed by using a second electrode composed of a second molded body molded from a mixed powder including a powder of a metal and a powder of a ceramic or the second electrode processed with a heat treatment, generating pulsing electric discharges between the blade pressure side of the deposition layer and the second electrode in an electrically insulating liquid or gas, and welding a material of the second electrode or a reacting substance of the material of the second electrode on the blade pressure side of the deposition layer by means of energy of the electric discharges.

Further, a second feature of the present invention is that, in a compressor for compressing air applied to a jet engine, the compressor is provided with: a titanium compressor case composed of a titanium alloy; a compressor rotor arranged inside the compressor case, the compressor rotor including plural titanium rotor blades at even intervals and being rotatable around a case axial center of the titanium compressor case, wherein, instead of having an abradable coating formed on an internal surface of the titanium compressor case, each of the titanium rotor blades includes; a rotor blade main body composed of a titanium alloy; a deposition layer formed at a tip end portion of the rotor blade main body, the deposition layer being formed by using a first electrode composed of a first molded body molded from a powder of a cobalt-chromium alloy or a nickel alloy, or the first molded body processed with a heat treatment, generating pulsing electric discharges between the tip end portion of the rotor blade main body and the first electrode in an electrically insulating liquid or gas, and welding a material of the first electrode or a reacting substance of the material of the first electrode on the tip end portion of the blade main body by means of energy of the electric discharges; and an abrasive coating having abrasiveness formed at a blade pressure side of the deposition layer, the abrasive coating being formed by using a second electrode composed of a solid body of Si, a second molded body molded from a powder of Si, or the second molded body processed with a heat treatment, generating pulsing electric discharges between the blade pressure side of the deposition layer and the second electrode in an electrically insulating oil, and welding a material of the second electrode or a reacting substance of the material of the second electrode on the blade pressure side of the deposition layer by means of energy of the electric discharges.

Further, a third feature of the present invention is that, in a compressor for compressing air applied to a jet engine, the compressor is provided with: a titanium compressor case composed of a titanium alloy; a compressor rotor arranged inside the compressor case, the compressor rotor including plural titanium rotor blades at even intervals and being rotatable around a case axial center of the titanium compressor case, wherein, instead of having an abradable coating formed on an internal surface of the titanium compressor case, each of the titanium rotor blades includes; a rotor blade main body composed of a titanium alloy; and an abrasive coating having abrasiveness formed at a portion ranging from a blade pressure side to a leading end side of the rotor blade main body, the abrasive coating being formed by using an electrode composed of a molded body molded from a mixed powder including a powder of a metal and a powder of a ceramic or a powder of an electrically conductive ceramic, or the electrode processed with a heat treatment, generating pulsing electric discharges between the portion ranging from the blade pressure side to the leading end side of the rotor blade main body and the electrode in an electrically insulating liquid or gas, and welding a material of the electrode or a reacting substance of the material of the electrode on the portion ranging from the blade pressure side to the leading end side of the rotor blade main body by means of energy of the electric discharges.

Further, a fourth feature of the present invention is that, in a compressor for compressing air applied to a jet engine, the compressor is provided with: a titanium compressor case composed of a titanium alloy; a compressor rotor arranged inside the compressor case, the compressor rotor including plural titanium rotor blades at even intervals and being rotatable around a case axial center of the titanium compressor case, wherein, instead of having an abradable coating formed on an internal surface of the titanium compressor case, each of the titanium rotor blades includes; a rotor blade main body composed of a titanium alloy; and an abrasive coating having abrasiveness formed at a portion ranging from a blade pressure side to a leading end side of the rotor blade main body, the abrasive coating being formed by using an electrode composed of a solid body of Si, a molded body molded from a powder of Si, or the molded body processed with a heat treatment, generating pulsing electric discharges between the portion ranging from the blade pressure side to the leading end side of the rotor blade main body and the electrode in an electrically insulating oil, and welding a material of the electrode or a reacting substance of the material of the electrode on the portion ranging from the blade pressure side to the leading end side of the rotor blade main body by means of energy of the electric discharges.

BEST MODE FOR CARRYING OUT THE INVENTION

To describe the present invention in further detail, respective embodiments of the present invention will be described hereinafter with proper reference to the appended drawings. Meanwhile, in these drawings, "FF" denotes a forward direction, and "FR" denotes a rearward direction. Further, in the description below, "a longitudinal direction" is referred to as an X-axis direction, "a lateral direction" is referred to as a Y-axis direction, and "a vertical direction" is referred to as a Z-axis direction.

First Embodiment

A first embodiment will be described hereinafter with reference to FIGS. 1 through 4.

Figure 1:
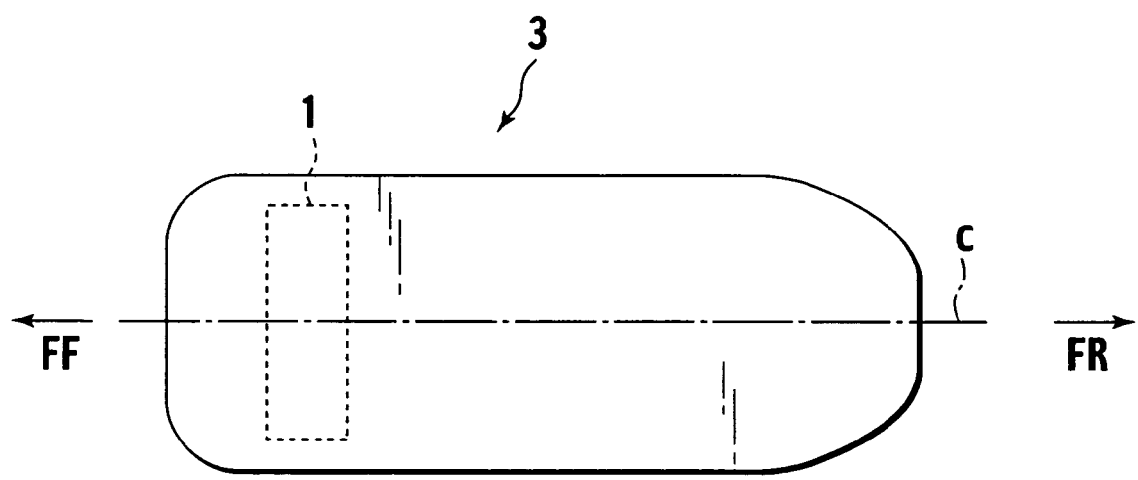
FIG. 1 is a schematic drawing of a jet engine in accordance with embodiments.
Figure 2:
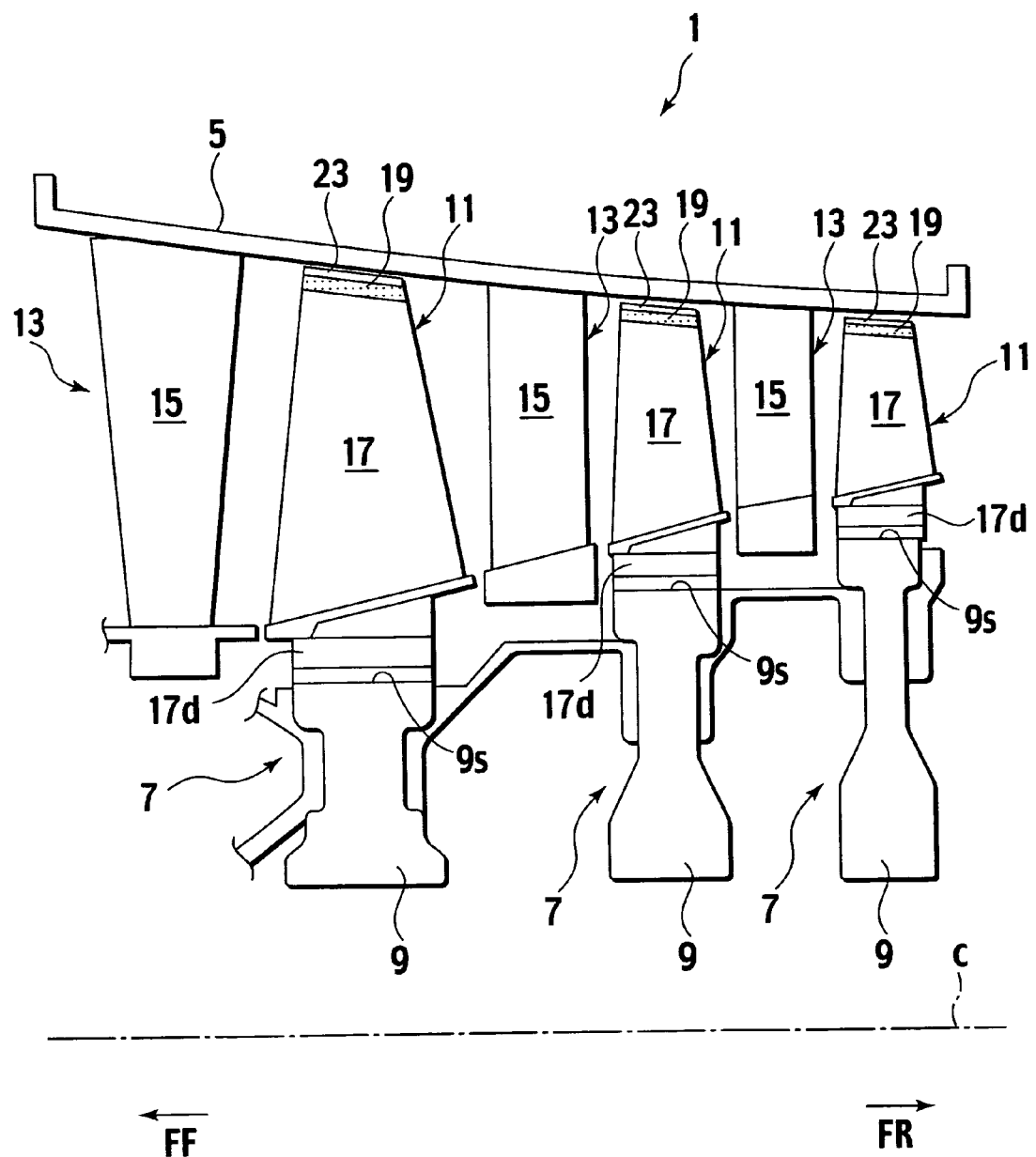
FIG. 2 is a cross sectional view of an upper half of a compressor in accordance with the embodiments.

As shown in FIG. 1 and FIG. 2, a compressor 1 in accordance with the embodiment is applied to a jet engine 3 and compresses air. Further, the compressor 1 is provided with a titanium compressor case 5 composed of a titanium alloy, and a compressor case of nickel (not shown) composed of a nickel alloy.

Inside the titanium compressor case 5, plural stages of titanium compressor rotors 7 being rotatable around an axial center S of the case, or in other words, around an axial center S of the engine, are provided, and the plural stages of the titanium compressor rotors 7 are linked with each other in a unitary body. Here, each stage of the titanium compressor rotor 7 is provided with a titanium disc 9 composed of a titanium alloy, an outer peripheral surface of which is formed with plural dovetail grooves 9s at even intervals, and plural titanium rotor blades 11 composed of a titanium alloy provided at the plural dovetail grooves 9s in the titanium disc 9.

Further, inside the titanium compressor case 5, plural stages of titanium compressor stators 13 are arranged reciprocally with the plural stages of the titanium compressor rotors 7. Here, each stage of the titanium compressor stators 13 is provided with plural titanium stator vanes 15 composed of a titanium alloy.

Meanwhile, though illustration is omitted, inside the nickel compressor case, plural stages of nickel compressor rotors are respectively arranged, and the plural stages of the nickel compressor rotors are linked with the plural stages of the titanium compressor rotors in a unitary body. Further, inside the nickel compressor case, plural stages of nickel compressor stators are arranged reciprocally with the plural stages of the nickel compressor rotors.

Figure 3:
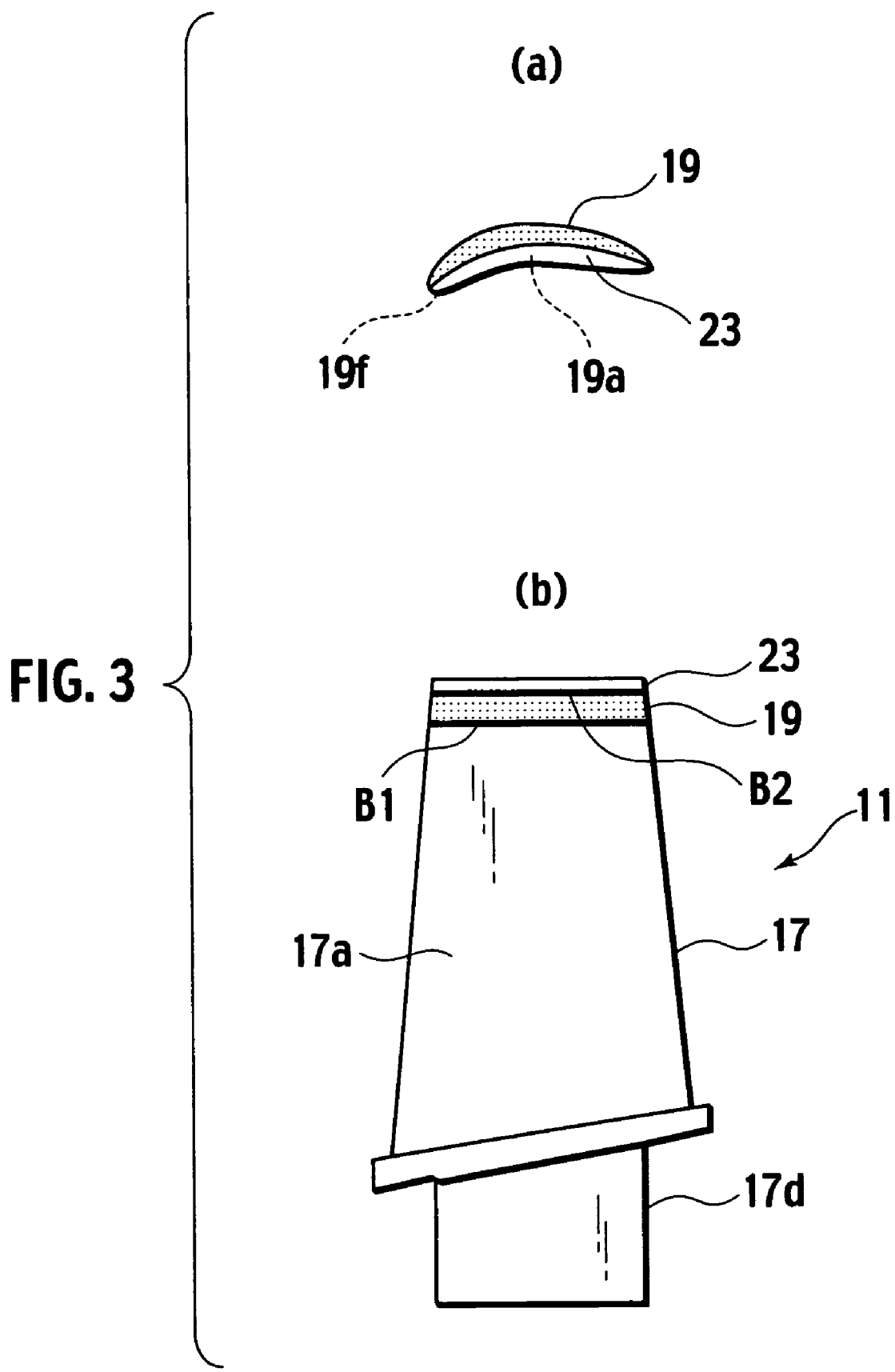
FIG. 3(a) is a drawing showing a tip end portion of a titanium rotor blade in accordance with a first embodiment.
FIG. 3(b) is a side view of the titanium rotor blade in accordance with the first embodiment.

As shown in FIG. 3, the titanium rotor blade 11 in accordance with the first embodiment is provided with a rotor blade main body 17 composed of a titanium alloy, and the rotor blade main body 17 has a dovetail 17d at a proximal end thereof, which is engageable with the dovetail groove 9s.

At a tip end portion of the rotor blade main body 17, a deposition layer 19 is formed. And, the deposition layer 19 is formed by using a first electrode 21 (see FIG. 5(b)), generating pulsing electric discharges between the tip end portion of the rotor blade main body 17 and the first electrode 21 in electrically insulating liquid S (see FIG. 3), and welding a material of the first electrode 21 or a reacting substance of the material on the tip end of the rotor blade main body 17 by means of energy of the electric discharge. Meanwhile, instead of generating pulsing electric discharges in the electrically insulating liquid S, generating pulsing electric discharges in electrically insulating gas may be allowed.

Here, the first electrode 21 is composed of a first molded body molded from powder of a cobalt-chrome alloy or powder of a nickel alloy by compression by pressing, or the first molded body processed with a heat treatment by a vacuum furnace or such. Further, "welding" means any meanings including carrying out welding accompanied by diffusion, carrying out welding accompanied by deposition, and welding accompanied by deposition and diffusion.

Meanwhile, instead of compression, the first electrode 21 may be molded by slurry pouring, MIM (Metal Injection Molding), spraying or such. Further, the tip end portion of the first electrode 21 expresses a shape similar to the tip end portion of the rotor blade main body 17.

Instead of forming an abradable coating on an internal surface of the titanium compressor case 5, an abrasive coating 23 having abrasiveness is formed on a pressure side 19a of the deposition layer 19. Here, the term "abrasiveness" means a quality of abrading with respect to a member where a member abrades an opposite member having relation of mutual friction with the member, and the abrasive coating 23 is capable of abrading the internal surface of the titanium compressor case 5 having relation of mutual friction. And, the abrasive coating 23 is formed by using a second electrode 25 (see FIG. 5(c)), generating pulsing electric discharges between the pressure side 19a of the deposition layer 19 and the second electrode 25 in electrically insulating liquid S, and welding a material of the second electrode 25 or a reacting substance of the material on the pressure side 19a of the deposition layer 19 by means of energy of the electric discharge. Meanwhile, instead of generating pulsing electric discharges in the electrically insulating liquid S, generating pulsing electric discharges in electrically insulating gas may be allowed.

Here, the second electrode 25 is composed of a second molded body molded from mixed powder of metal powder and ceramic powder, or electrically conductive ceramic powder by compression by pressing, or the second molded body processed with a heat treatment by a vacuum furnace or such. Further, the ceramic means any one material or any two or more mixed materials from cBN, TiC, TiN, TiAlN, $TiB_2$, WC, SiC, $Si_3N_4$, $Cr_3C_2$, $Al_2O_3$, $ZrO_2$—Y, ZrC, VC and $B_4C$. Furthermore, the electrically conductive ceramic powder may be produced by adhering conductive coatings on surfaces of the ceramic powder. Further, "welding" means any meanings including carrying out welding accompanied by diffusion, carrying out welding accompanied by deposition, and welding accompanied by deposition and diffusion.

Meanwhile, instead of compression, the second electrode 25 may be molded by slurry pouring, MIM (Metal Injection Molding), spraying or such. Further, the tip end portion of the second electrode 25 expresses a shape similar to the pressure side 19a of the deposition layer 19, or in other words, a pressure side 17a of the tip end portion of the rotor blade main body 17.

On the other hand, instead of the second electrode 25, another second electrode 27 composed of a solid body of Si, another second molded body molded from powder of Si by compression by pressing, or said another second molded body processed with a heat treatment may be used. And, in this case, pulsing electric discharges are generated in electrically insulating oil. Meanwhile, said another second electrode 27 may be molded by slurry pouring, MIM (Metal Injection Molding), spraying or such, instead of compression.

Further, the tip end portion of said another second electrode 25 expresses a shape similar to the pressure side 19a of the deposition layer 19, or in other words, a pressure side 17a of the tip end portion of the rotor blade main body 17.

Furthermore, in a boundary between the deposition layer 19 and the rotor blade main body 17, and a boundary between the abrasive coating 23 and the deposition layer 19, fused portions (fused layers) B1, B2, in which composition ratios grades in these thickness directions, are respectively generated. And, at a time of forming the deposition layer 19 and the abrasive coating 23, by selecting a proper electric discharge condition, the fused portions B1, B2 are formed to be 3 μm or more and 20 μm or less in thickness. Meanwhile, the proper electric discharge condition is that a peak current is 30 A or less and a pulse width is 200 μs or less, and more preferably that a peak current is 20 A or less and a pulse width is 20 μs or less.

Figure 6:
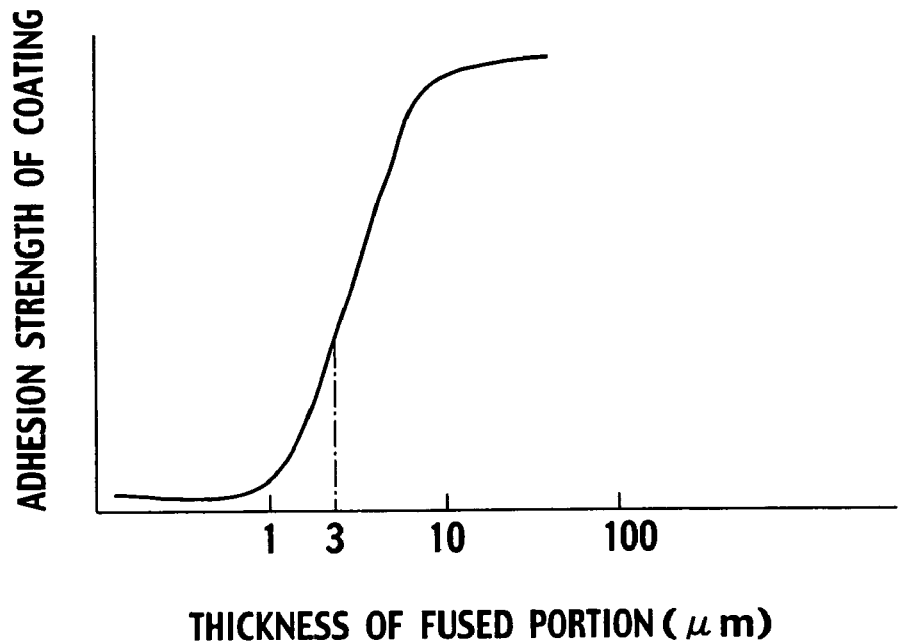
FIG. 6 is a graph relating thickness of a fused portion to adhesion strength of a coating in a case where the coating is formed on a base member of metal by means of energy of electric discharges.
Figure 7:
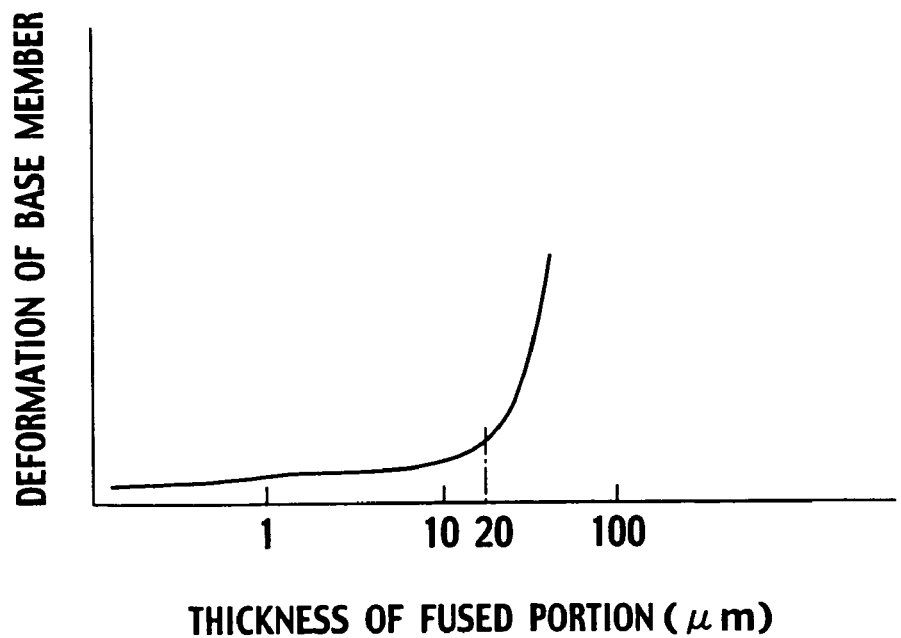
FIG. 7 is a graph relating thickness of the fused portion to deformation of the base member of metal in a case where the coating is formed on the base member of metal by means of energy of electric discharges.

To form the fused portions B1, B2 to be 3 μm or more and 20 μm or less in thickness is based on experimental results shown in FIG. 6 and FIG. 7.

More specifically, in cases of forming coatings on base members of metal by energy of electric discharges as changing electric discharge conditions, relation between thickness of fused portions generated in boundaries between the base members and the coatings and adhesion strength of the coatings is as shown in FIG. 6, and a novel first knowledge could be gained in which the adhesion strength gets higher when the thickness of the fused portion gets 3 μm or more. Further, relation between thickness of fused portions and deformation of the base members is as shown in FIG. 7, and a novel second knowledge could be gained in which the deformation is suppressed when the thickness of the fused portion gets 20 μm or less. Therefore, from the novel first and second knowledges, the fused portions B1, B2 are set to be 3 μm or more and 20 μm or less in thickness so as to increase the adhesion strength of the deposition layer 19 and the abrasive coating 23 as well as to suppress deformation of the base member of the rotor blade main body 17.

Meanwhile, the horizontal axes of FIG. 6 and FIG. 7 are logarithmic scales with respect to the thicknesses of the fused portions. The vertical axis of FIG. 6 is a non-dimensional scale of the adhesion strengths of the coatings, and the vertical axis of FIG. 7 is a non-dimensional scale of the deformations of the base members.

Figure 4:
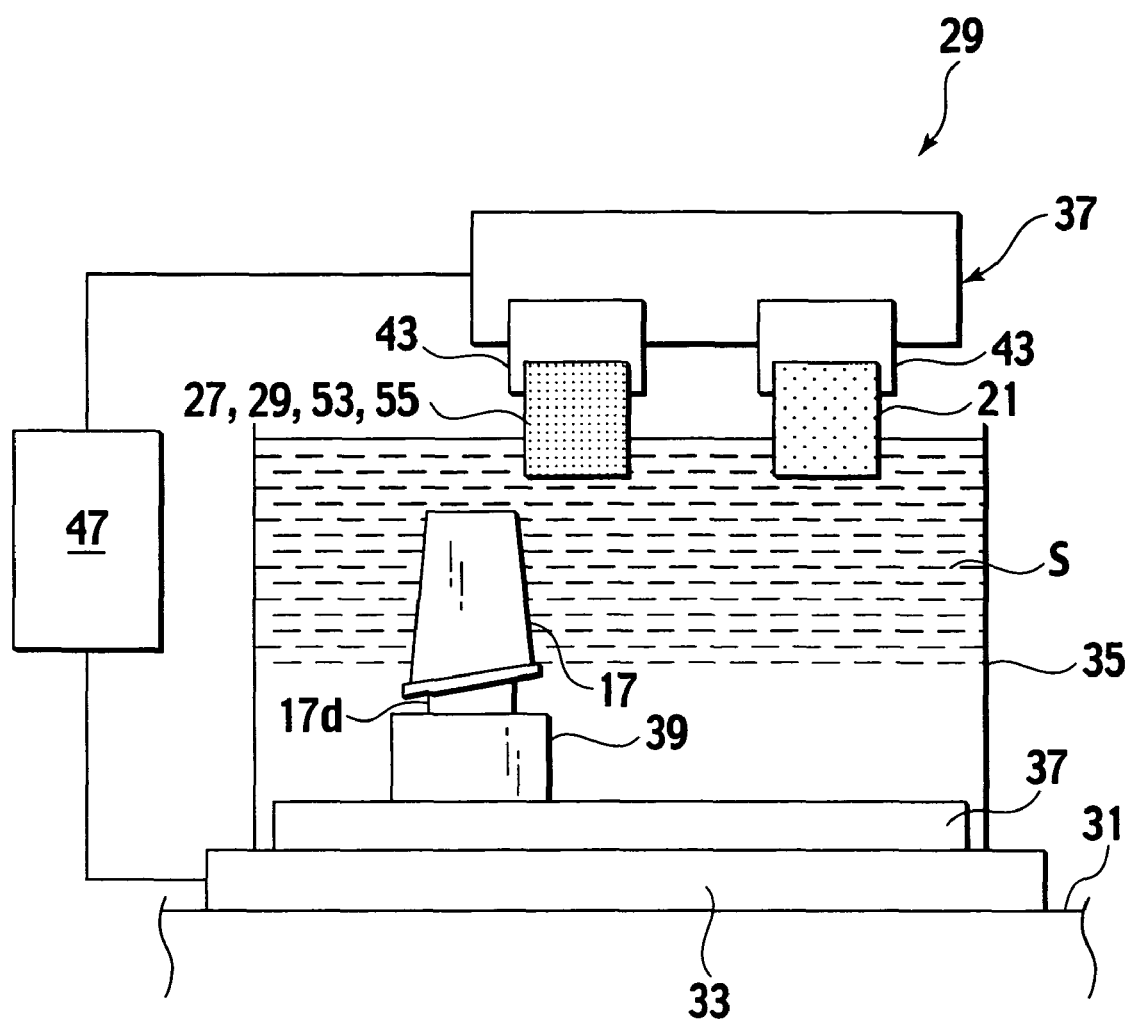
FIG. 4 is a schematic drawing of an electric spark machine in accordance with the embodiments.

Next, as shown in FIG. 4, an electric spark machine 29 is provided with a bed 31, and the bed 31 is provided with a table 33. The table 33 is movable in the X-axis direction by means of a drive of a not-shown X-axis servo-motor and movable in the Y-axis direction by means of a drive of a not-shown Y-axis servo-motor.

The table 33 is provided with a processing bath 35 for reserving electrically insulating liquid S, such as oil and, in the processing bath 35, a support plate 37 is provided. The support plate 37 is provided with a jig 39 for clamping the dovetail 17d of the titanium rotor blade 11.

Above the bed 31, a processing head 41 is provided with interposing a not-shown column and the processing head 41 is movable in the Z-axis direction by means of a drive of a not-shown Z-axis servo-motor. The processing head 41 is provided with a first holder 43 for supporting a first electrode 21, and, in the vicinity of the first holder 43 in the processing head 41, a second holder 45 for supporting a second electrode 25 or another second electrode 27. Moreover, the first holder 43 and the second holder 45 are electrically connected to a common electric power source 47. Meanwhile, the first holder 43 and the second holder 45 may be independently connected to the respective electric power sources.

Figure 5:
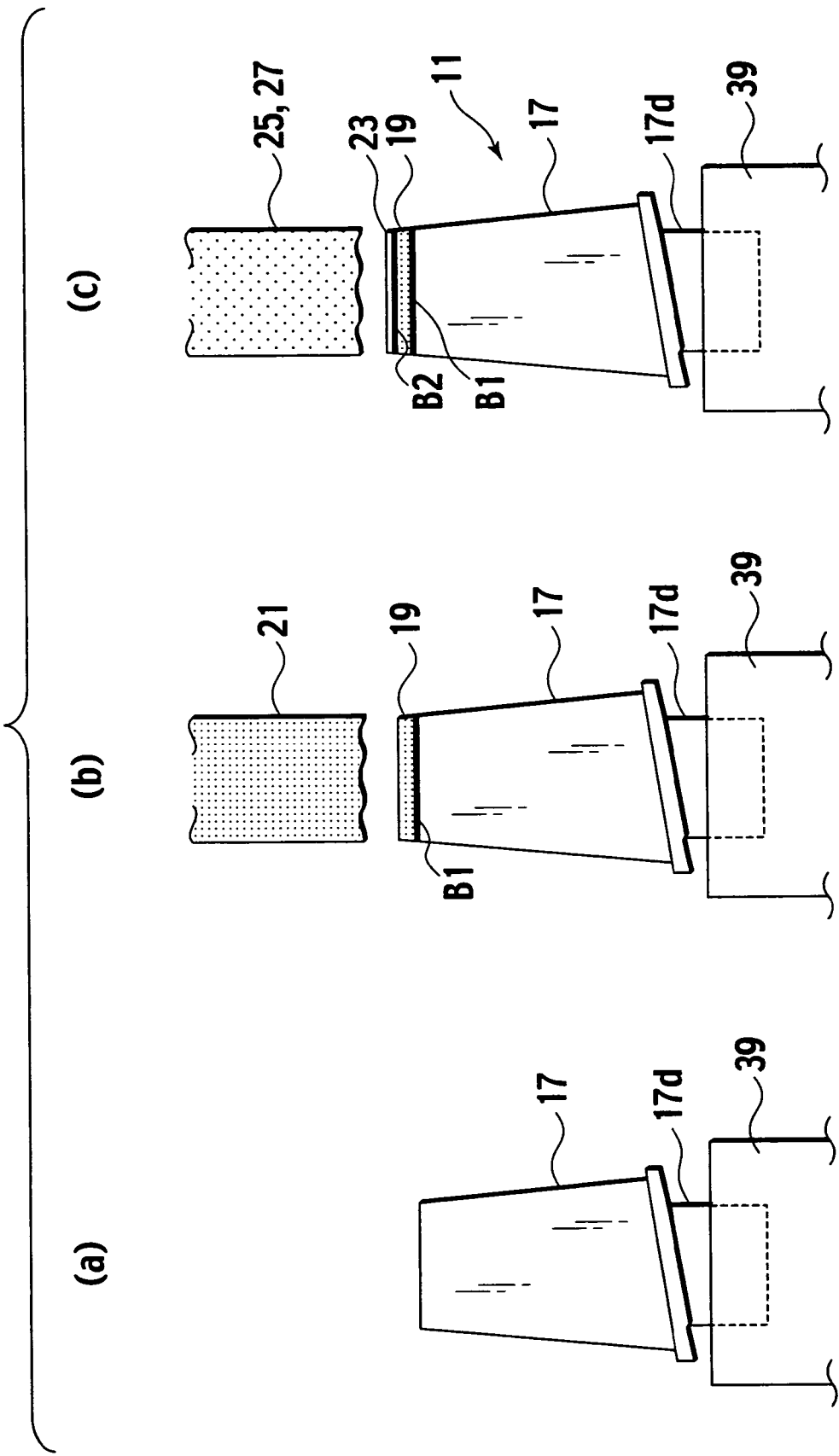
FIGS. 5(a)(b)(c) are schematic drawings explaining a production method of a titanium rotor blade in accordance with the first embodiment.

As shown in FIG. 4 and FIG. 5, the production method of the titanium rotor blade in accordance with the first embodiment is a method for production of the titanium rotor blade 11 from the rotor blade main body 17 composed of a titanium alloy, and, in concrete, is as follows.

More specifically, as shown in FIG. 5(a), in a state that the tip end portion of the rotor blade main body 17 is directed upward, the dovetail 17d of the rotor blade main body 17 is clamped by the jig 39, thereby the rotor blade main body 17 is set in a predetermined position in the processing bath 35. Next, by means of drives of the X-axis servo-motor and the Y-axis servo-motor, the table 33 is moved in the X-axis direction and the Y-axis direction to position the rotor blade main body 17 so that the tip end portion of the rotor blade main body 17 is vertically opposed to the first electrode 21. Meanwhile, there may be a case where the table 33 is only necessary to be moved in any of the X-axis direction and the Y-axis direction.

Next, by means of a drive of the Z-axis servo-motor, the first electrode 21 as being unitary with the processing head 41 is moved in the Z-axis direction, and further the pulsing electric discharges between the tip end portion of the rotor blade main body 17 and the first electrode 21 are generated in an electrically insulating liquid SL in the proper electric discharge condition. Thereby, as shown in FIG. 5(b), by means of energy of the electric discharges, the material of the first electrode 21 or the reacting substance of the material is welded on the tip end portion of the rotor blade main body 17 so that the deposition layer 19 is formed on the tip end portion of the rotor blade main body 17. Meanwhile, when generating the pulsing electric discharges, the first electrode 21, as being unitary with the processing head 41, is reciprocated in the Z-axis direction by a small travel distance by means of a drive of the Z-axis servo-motor.

After forming the deposition layer 19, by means of drives of the X-axis servo-motor and the Y-axis servo-motor, the table 33 is moved in the X-axis direction and the Y-axis direction to position the rotor blade main body 17 so that the blade pressure side 19a of the deposition layer 19 is vertically opposed to the second electrode 25 or said another second electrode 27. Meanwhile, there may be a case where the table 33 is only necessary to be moved in any of the X-axis direction and the Y-axis direction. And, by means of a drive of the Z-axis servo-motor, the second electrode 25 or said another second electrode 27 as being unitary with the processing head 41 is moved in the Z-axis direction, and further the pulsing electric discharges between the blade pressure side 19a of the deposition layer 19a and the second electrode 25 or said another second electrode 27 are generated in electrically insulating liquid SL in the proper electric discharge condition. Thereby, as shown in FIG. 5(c), by means of energy of the electric discharges, the material of the second electrode 25 or said another second electrode 27 or the reacting substance of the material is welded on the blade pressure side 19a of the deposition layer 19 so that the abrasive coating 23 having abrasiveness is formed on the blade pressure side 19a of the deposition layer 19. Meanwhile, when generating the pulsing electric discharges, the second electrode 25 or said another second electrode 27, as being unitary with the processing head 41, is reciprocated in the Z-axis direction by a small travel distance by means of a drive of the Z-axis servo-motor.

By the above, the titanium rotor blade 11 can be produced from the rotor blade main body 17 composed of a titanium alloy.

Next, an operation of the first embodiment will be described hereinafter.

Since the abrasive coating 23 is formed on the blade pressure side 19a of the deposition layer 19, even if the abrasive coating 23 is in contact with the internal surface of the titanium compressor case 5 during rotation of the titanium compressor rotor 7, it merely cause that the internal surface of the titanium compressor case 5 is abraded by the abrasive coating 23 and titanium fire can be prevented. In other words, titanium fire can be prevented by means of the abrasive coating 23 formed on the tip end portion of the rotor blade main body 17 with interposing the deposition layer 19.

Furthermore, since the deposition layer 19 composed of a cobalt-nickel alloy or a nickel alloy is formed as a base layer for the abrasive coating 23, titanium fire will not occur even after the abrasive coating 23 stops to accomplish the abrasiveness and safety is increased.

Further, since the abrasive coating 23 is formed not by spraying but by welding the material of the second electrode 25 or said another second electrode 27 by means of energy of the electric discharge, a range of the abrasive coating 23 can be limited to a range of generation of electric discharges and hence a blast treatment before formation of the abrasive coating 23, a pre-treatment such as adhesion of the masking tape, and a post-treatment such as removal of the masking tape after formation of the abrasive coating 23 come to be unnecessary. Similarly, since the deposition layer 19 is formed not by spraying but by welding the material of the second electrode 25 or said another second electrode 27 by means of energy of the electric discharges, a range of the deposition layer 19 can be limited to a range of generation of electric discharges and hence a blast treatment before formation of the deposition layer 19, a pre-treatment such as adhesion of the masking tape, and a post-treatment such as removal of the masking tape after formation of the deposition layer 19 come to be unnecessary.

Furthermore, since the fused portions B1, B2 are constituted so as to be 3 μm or more and 20 μm or less in thickness, in other words, the proper electric discharge condition is selected at a time of formation of the deposition layer 19 and the abrasive coating 23, the adhesion strengths of the deposition layer 19 and the abrasive coating 23 can be increased as well as deformation of the base member of the rotor blade main body 17 can be suppressed.

In accordance with the first embodiment as described above, since the titanium fire can be prevented by means of the abrasive coating 23 formed on the tip end portion of the rotor blade main body 17 with interposing the deposition layer 19, a porous abradable coating as mentioned above is not required to be formed on the internal surface of the titanium compressor case 5. Thereby, air resistance in the titanium compressor case 5 is made to be smaller and reduction in compression efficiency of the compressor 1 can be suppressed.

Further, since the range of the abrasive coating 23 can be limited to the range of generation of the electric discharges, and the blast treatment before formation of the abrasive coating 23, the pre-treatment such as adhesion of the masking tape, and the post-treatment such as removal of the masking tape after formation of the abrasive coating 23 come to be unnecessary, number of steps required for production of the compressor 1, in other words, steps required for production of the titanium rotor blade 11 is cut off, thereby improvement of working efficiency can be easily achieved.

Furthermore, since the adhesion strengths of the deposition layer 19 and the abrasive coating 23 are increased as well as the deformation of the base member of the rotor blade main body 17 can be suppressed, quality of the titanium rotor blade 11, in other words, quality of the compressor 1 is stabilized.

Second Embodiment

A second embodiment will be described hereinafter with reference to FIG. 1, FIG. 4, FIG. 6, FIG. 7, FIG. 8, and FIG. 9.

Figure 8:
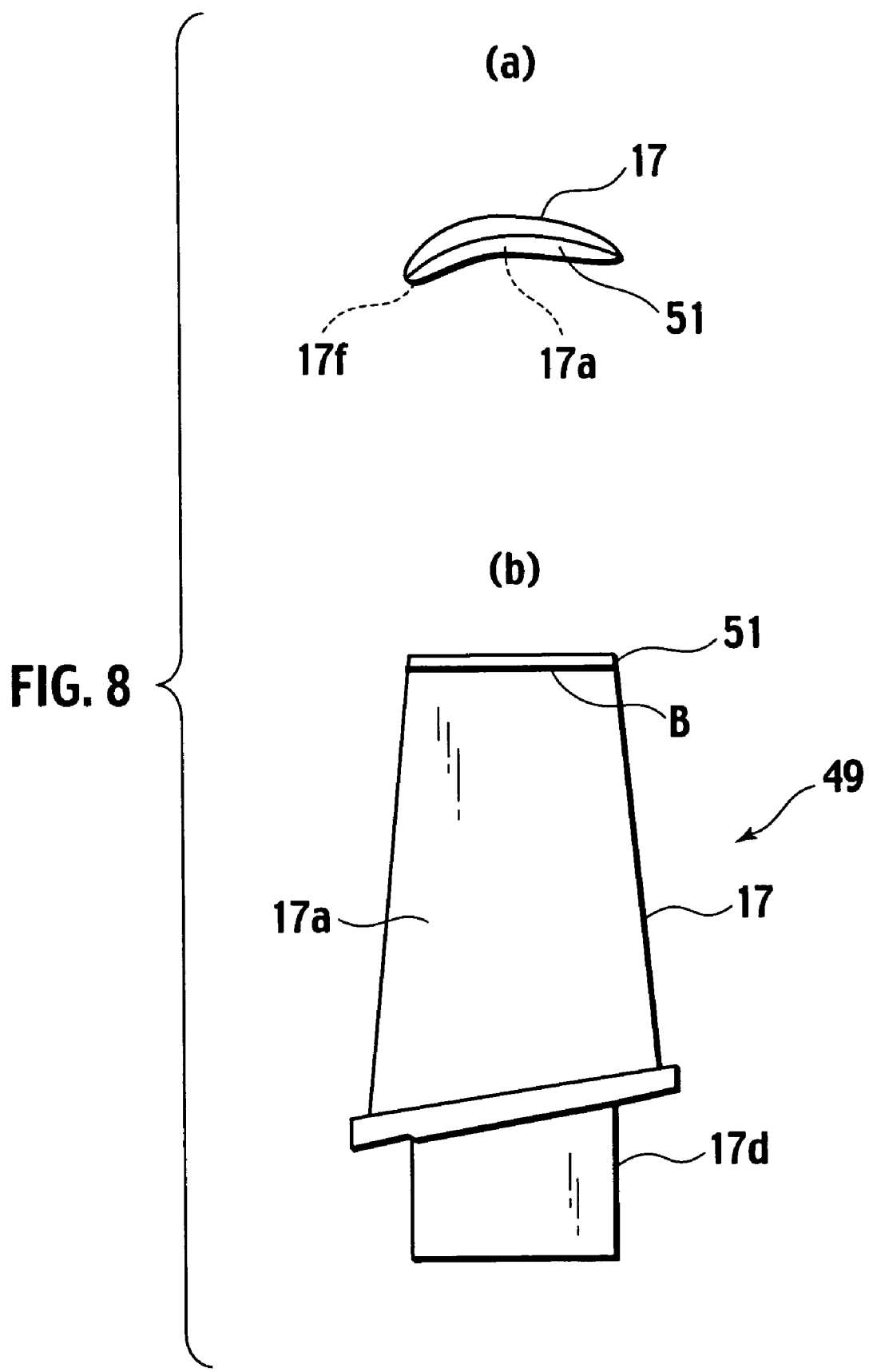
FIG. 8(a) is a drawing showing a tip end portion of a titanium rotor blade in accordance with a modified example of a second embodiment.
FIG. 8(b) is a side view of the titanium rotor blade in accordance with the modified example of the second embodiment.
Figure 9:
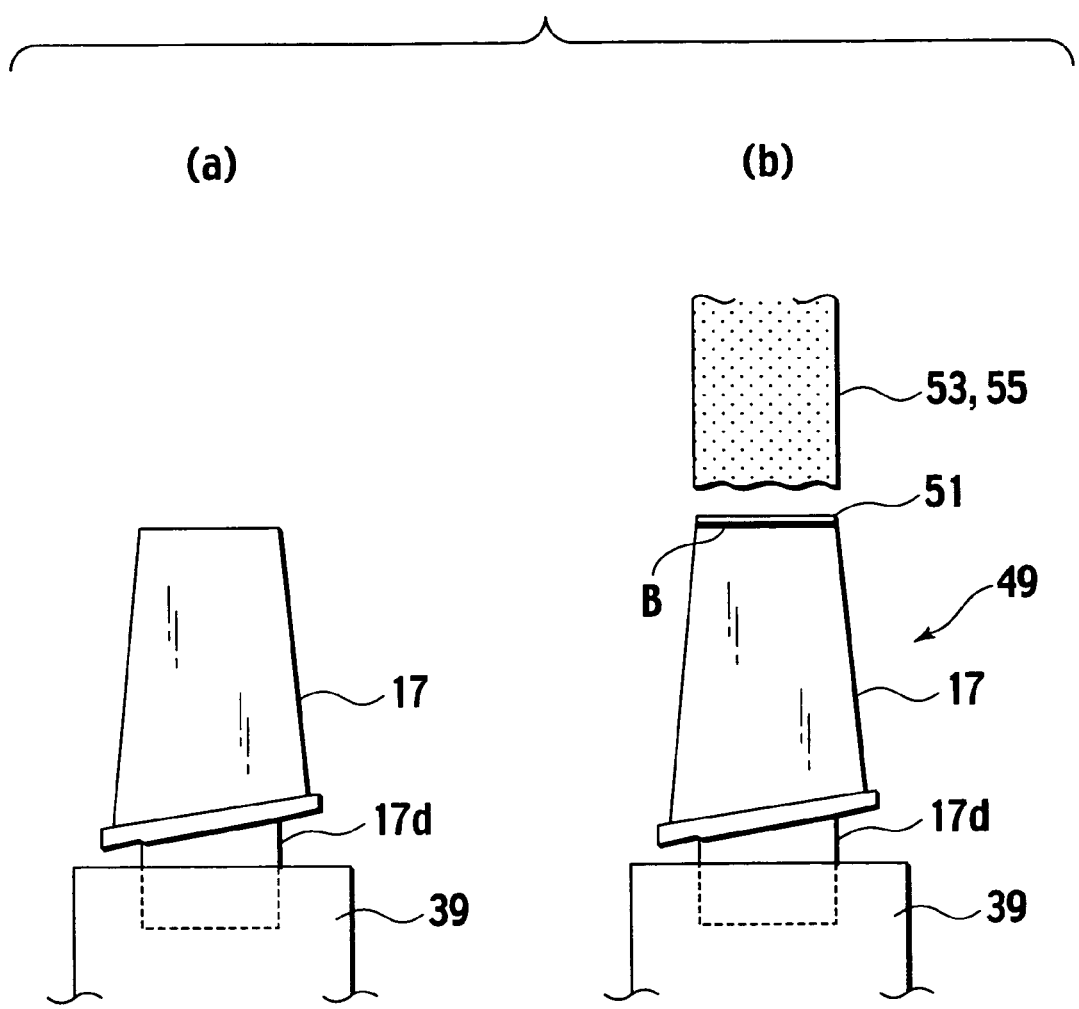
FIGS. 9(a)(b) are schematic drawings explaining a production method of the titanium rotor blade in accordance with the second embodiment.

As shown in FIG. 1, FIG. 8, and FIG. 9, a titanium rotor blade 49 in accordance with the second embodiment is, as similar to the titanium rotor blade 11 in accordance with the first embodiment, applied to the compressor 1 of the jet engine 3, and is provided with the rotor blade main body 17 composed of a titanium alloy. The rotor blade main body 17 has the dovetail 17d engageable with the dovetail groove 9s at the proximal end thereof. Further, instead of having an abradable coating formed on the internal surface of the titanium compressor case 5, an abrasive coating 51 having abrasiveness is formed on a portion ranging from the blade pressure side 17a to a leading end side 17f of the tip end portion of the rotor blade main body 17.

The abrasive coating 51 is formed by using an electrode 53 having the same constitution as the second electrode 25, generating pulsing electric discharges between the portion ranging from the blade pressure side 17a to the leading end side 17f of the tip end portion of the rotor blade main body 17 and the electrode 53 in electrically insulating liquid S, and welding a material of the electrode 53 or a reacting substance of the material on the portion ranging from the blade pressure side 17a to the leading end side 17f of the tip end portion of the rotor blade main body 17 by means of energy of the electric discharges. Meanwhile, instead of generating pulsing electric discharges in the electrically insulating liquid S, generating pulsing electric discharges in electrically insulating gas may be allowed.

On the other hand, instead of the electrode 53, another electrode 55 having the same constitution as aforementioned another second electrode 27 may be used. And, in this case, pulsing electric discharges are generated in electrically insulating oil.

Further, in a boundary between the abrasive coating 51 and the rotor blade main body 17, a fused portion (a fused layer) B, in which composition ratio grades in its thickness direction, is generated. And, by selecting a proper electric discharge condition at a time of forming the abrasive coating 51, the fused portion B is constituted so as to be 3 μm or more and 20 μm or less in thickness. Meanwhile, the proper electric discharge condition is that a peak current is 30 A or less and a pulse width is 200 μs or less, and more preferably that a peak current is 20 A or less and a pulse width is 20 μs or less.

Here, the reason why the fused portion B is to be 3 μm or more and 20 μm or less in thickness is based on the experimental results shown in FIG. 6 and FIG. 7 as similar to the fused portions B1, B2 in the first embodiment.

As shown in FIG. 4 and FIG. 9, the production method of the titanium rotor blade in accordance with the second embodiment is a method for production of the titanium rotor blade 49 from the rotor blade main body 17 composed of a titanium alloy, and, in concrete, comes to be as follows.

More specifically, as shown in FIG. 9(a), in a state that the tip end portion of the rotor blade main body 17 is directed upward, the dovetail 17d of the rotor blade main body 17 is clamped by the jig 39, thereby the rotor blade main body 17 is set in a predetermined position in the processing bath 35. Next, by means of drives of the X-axis servo-motor and the Y-axis servo-motor, the table 33 is moved in the X-axis direction and the Y-axis direction to position the rotor blade main body 17 so that the portion ranging from the blade pressure side to the leading end side of the tip end portion of the rotor blade main body 17 is vertically opposed to the electrode 53 supported by a second holder 45. Meanwhile, there may be a case where the table 33 is only necessary to be moved in any of the X-axis direction and the Y-axis direction.

Next, by means of drives of the X-axis servo-motor and the Y-axis servo-motor, the table 33 is moved in the X-axis direction and the Y-axis direction to position the rotor blade main body 17 so that the portion ranging from the blade pressure side to the leading end side of the tip end portion of the rotor blade main body 17 is vertically opposed to the electrode 53 or said another electrode 55. Meanwhile, there may be a case where the table 33 is only necessary to be moved in any of the X-axis direction and the Y-axis direction. And, by means of a drive of the Z-axis servo-motor, the electrode 53 or said another electrode 55 as being unitary with the processing head 41 is moved in the Z-axis direction, and further the pulsing electric discharges between the portion ranging from the blade pressure side to the leading end side of the tip end portion of the rotor blade main body 17 and the electrode 53 or said another electrode 55 in an electrically insulating liquid SL in the proper electric discharge condition. Thereby, as shown in FIG. 9(b), by means of energy of the electric discharges, the material of the electrode 53 or the reacting substance of the material is welded on the portion ranging from the blade pressure side 17a to the leading end side 17f of the tip end portion of the rotor blade main body 17 so that the abrasive coating 51 having abrasiveness is formed. Meanwhile, when generating the pulsing electric discharges, the electrode 53 or said another electrode 55, as being unitary with the processing head 41, is reciprocated in the Z-axis direction by a small travel distance by means of a drive of the Z-axis servo-motor.

By the above, the titanium rotor blade 49 can be produced from the rotor blade main body 17 composed of a titanium alloy.

Next, an operation of the first embodiment will be described hereinafter.

Since the abrasive coating 51 is formed on the portion ranging from the blade pressure side 17a to the leading end side 17f of the rotor blade main body 17, even if the abrasive coating 51 is in contact with the internal surface of the titanium compressor case 5 during rotation of the titanium compressor rotor 7, it merely cause that the internal surface of the titanium compressor case 5 is abraded by the abrasive coating 51 and titanium fire can be prevented. In other words, titanium fire can be prevented by means of the abrasive coating 51 formed on the tip end portion of the rotor blade main body 17.

Further, since the abrasive coating 51 is formed not by spraying but by welding the material or such of the electrode 53 or said another electrode 55 by means of energy of the electric discharges, a range of the abrasive coating 51 can be limited to a range of generation of electric discharges and hence a blast treatment before formation of the abrasive coating 51, a pre-treatment such as adhesion of the masking tape, and a post-treatment such as removal of the masking tape after formation of the abrasive coating 51 come to be unnecessary.

Furthermore, since the fused portion B is constituted so as to be 3 μm or more and 20 μm or less in thickness, in other words, the proper electric discharge condition is selected at a time of formation of the abrasive coating 51, the adhesion strength of the abrasive coating 51 can be increased as well as deformation of the base member of the rotor blade main body 17 can be suppressed.

In accordance with the second embodiment as described above, since the titanium fire can be prevented by means of the abrasive coating 51 formed on the tip end portion of the rotor blade main body 17, a porous abradable coating as mentioned above is not required to be formed on the internal surface of the titanium compressor case 5. Thereby, air resistance in the titanium compressor case 5 is made to be smaller and reduction in compression efficiency of the compressor 1 can be suppressed.

Further, since the range of the abrasive coating 51 can be limited to the range of generation of the electric discharges, and the blast treatment before formation of the abrasive coating 51, the pre-treatment such as adhesion of the masking tape, and the post-treatment such as removal of the masking tape after formation of the abrasive coating 51 come to be unnecessary, number of steps required for production of the compressor 1, in other words, steps required for production of the titanium rotor blade 49 is cut off, thereby improvement of working efficiency can be easily achieved.

Furthermore, since the adhesion strength of the abrasive coating 51 is increased as well as the deformation of the base member of the rotor blade main body 17 can be suppressed, quality of the titanium rotor blade 49, in other words, quality of the compressor 1 is stabilized.

As described above, the invention has been described above by reference to several preferable embodiments, however, the scope of right included in the present invention is not limited to these embodiments.

Moreover, the contents of Japanese Patent Application No. 2004-007282 filed with the Japan Patent Office on Jan. 14, 2004 should have been cited in the contents of the present application by reference.

The invention claimed is:

1. A compressor for compressing air applied to a jet engine, the compressor comprising:
 a titanium compressor case composed of a titanium alloy;
 a compressor rotor arranged inside the compressor case, the compressor rotor including plural titanium rotor blades at even intervals and being rotatable around a case axial center of the titanium compressor case,
 wherein each of the titanium rotor blades includes
  a rotor blade main body composed of a titanium alloy,
  a deposition layer formed at a tip end portion of the rotor blade main body, the deposition layer being formed by using a first electrode composed of a first molded body molded from a powder of a cobalt-chromium alloy or a nickel alloy, or the first molded body processed with a heat treatment, generating pulsing electric discharges between the tip end portion of the rotor blade main body and the first electrode in an electrically insulating liquid or gas, and welding a material of the first electrode or a reacting substance of the material of the first electrode on the tip end portion of the blade main body by means of energy of the electric discharges,
  an abrasive coating having abrasiveness formed at a blade pressure side of the deposition layer, the abrasive coating being formed by using a second electrode composed of a second molded body molded from a mixed powder including a powder of a metal and a powder of a ceramic or the second electrode processed with a heat treatment, generating pulsing electric discharges between the blade pressure side of the deposition layer and the second electrode in an electrically insulating liquid or gas, and welding a material of the second electrode or a reacting substance of the material of the second electrode on the blade pressure side of the deposition layer by means of energy of the electric discharges, and
  fused portions respectively generated at a boundary between the deposition layer and the tip end portion of the rotor blade main body and at a boundary between the abrasive coating and the deposition layer, such that each of the fused portions includes a composition ratio grading in a thickness direction and the fused portions are 3 μm or more and 20 μm or less in thickness.

2. A compressor for compressing air applied to a jet engine, the compressor comprising:
 a titanium compressor case composed of a titanium alloy;
 a compressor rotor arranged inside the compressor case, the compressor rotor including plural titanium rotor blades at even intervals and being rotatable around a case axial center of the titanium compressor case,
 wherein each of the titanium rotor blades includes
  a rotor blade main body composed of a titanium alloy,
  a deposition layer formed at a tip end portion of the rotor blade main body, the deposition layer being formed by using a first electrode composed of a first molded body molded from a powder of a cobalt-chromium alloy or a nickel alloy, or the first molded body processed with a heat treatment, generating pulsing electric discharges between the tip end portion of the rotor blade main body and the first electrode in an electrically insulating liquid or gas, and welding a material of the first electrode or a reacting substance of the material of the first electrode on the tip end portion of the blade main body by means of energy of the electric discharges,
  an abrasive coating having abrasiveness formed at a blade pressure side of the deposition layer, the abrasive coating being formed by using a second electrode composed of a solid body of Si, a second molded body molded from a powder of Si, or the second molded body processed with a heat treatment, generating pulsing electric discharges between the blade pressure side of the deposition layer and the second electrode in an electrically insulating oil, and welding a material of the second electrode or a reacting substance of the material of the second electrode on the blade pressure side of the deposition layer by means of energy of the electric discharges and
  fused portions respectively generated at a boundary between the deposition layer and the tip end portion of the rotor blade main body and at a boundary between the abrasive coating and the deposition layer, such that each of the fused portions includes a composition ratio grading in a thickness direction and the fused portions are 3 μm or more and 20 μm or less in thickness.

3. The compressor of claim 1 or 2, wherein a tip end portion of the first electrode is shaped similar to the tip end portion of the rotor blade main body.

4. The compressor of claim 1 or 2, wherein a tip end portion of the second electrode is shaped similar to the blade pressure side of the deposition layer.

5. A compressor for compressing air applied to a jet engine, the compressor comprising:
 a titanium compressor case composed of a titanium alloy;
 a compressor rotor arranged inside the compressor case, the compressor rotor including plural titanium rotor blades at even intervals and being rotatable around a case axial center of the titanium compressor case,
 wherein each of the titanium rotor blades includes
  a rotor blade main body composed of a titanium alloy,
  an abrasive coating having abrasiveness formed at a portion ranging from a blade pressure side to a leading end side of the rotor blade main body, the abrasive coating being formed by using an electrode composed of a molded body molded from a mixed powder including a powder of a metal and a powder of a ceramic or a powder of an electrically conductive ceramic, or the electrode processed with a heat treatment, generating pulsing electric discharges between the portion ranging from the blade pressure side to the leading end side of the rotor blade main body and the electrode in an electrically insulating liquid or gas, and welding a material of the electrode or a reacting substance of the material of the electrode on the portion ranging from the blade pressure side to the leading end side of the rotor blade main body by means of energy of the electric discharges, and a fused portion generated at a boundary between the abrasive coating and the rotor blade main body, such that the fused portion includes a composition ratio grading in a thickness direction and the fused portion is 3 µm or more and 20 µm or less in thickness.

6. The compressor recited in claim 1 or claim 5, wherein the ceramic is any one material or any two or more mixed materials from cBN, TiC, TiN, TiAlN, TiB2, WC, SiC, Si3N4, Cr3C2, Al2O3, ZrO2-Y, ZrC, VC and B4C.

7. A compressor for compressing air applied to a jet engine, the compressor comprising:
a titanium compressor case composed of a titanium alloy;
a compressor rotor arranged inside the compressor case, the compressor rotor including plural titanium rotor blades at even intervals and being rotatable around a case axial center of the titanium compressor case,
wherein each of the titanium rotor blades includes
a rotor blade main body composed of a titanium alloy,
an abrasive coating having abrasiveness formed at a portion ranging from a blade pressure side to a leading end side of the rotor blade main body, the abrasive coating being formed by using an electrode composed of a solid body of Si, a molded body molded from a powder of Si, or the molded body processed with a heat treatment, generating pulsing electric discharges between the portion ranging from the blade pressure side to the leading end side of the rotor blade main body and the electrode in an electrically insulating oil, and welding a material of the electrode or a reacting substance of the material of the electrode on the portion ranging from the blade pressure side to the leading end side of the rotor blade main body by means of energy of the electric discharges, and
a fused portion generated at a boundary between the abrasive coating and the rotor blade main body, such that the fused portion includes a composition ratio grading in a thickness direction and the fused portion is 3 µm or more and 20 µm or less in thickness.

8. A jet engine including the compressor recited in any of claim 1, claim 2, claim 5, or claim 7.

9. The compressor of claim 5 or 7, wherein a tip end portion of the electrode is shaped similar to the blade pressure side of the rotor blade main body.

10. A titanium rotor blade applied to a compressor in a jet engine, the titanium rotor blade comprising:
a rotor blade main body composed of a titanium alloy;
a deposition layer formed at a tip end portion of the rotor blade main body, the deposition layer being formed by using a first electrode composed of a first molded body molded from a powder of a cobalt-chromium alloy or a nickel alloy, or the first molded body processed with a heat treatment, generating pulsing electric discharges between the tip end portion of the rotor blade main body and the first electrode in an electrically insulating liquid or gas, and welding a material of the first electrode or a reacting substance of the material of the first electrode on the tip end portion of the blade main body by means of energy of the electric discharges;
an abrasive coating having abrasiveness formed at a blade pressure side of the deposition layer, the abrasive coating being formed by using a second electrode composed of a second molded body molded from a mixed powder including a powder of a metal and a powder of a ceramic or the second electrode processed with a heat treatment, generating pulsing electric discharges between the blade pressure side of the deposition layer and the second electrode in an electrically insulating liquid or gas, and welding a material of the second electrode or a reacting substance of the material of the second electrode on the blade pressure side of the deposition layer by means of energy of the electric discharges; and
fused portions respectively generated at a boundary between the deposition layer and the tip end portion of the rotor blade main body and at a boundary between the abrasive coating and the deposition layer, such that each of the fused portions includes a composition ratio grading in a thickness direction and the fused portions are 3 µm or more and 20 µm or less in thickness.

11. The titanium rotor blade recited in claim 10, wherein the ceramic is any one material or any two or more mixed materials from cBN, TiC, TiN, TiAlN, TiB2, WC, SiC, Si3N4, Cr3C2, Al2O3, ZrO2-Y, ZrC, VC and B4C.

12. A compressor including the titanium rotor blade recited in claim 10.

13. A production method of a titanium rotor blade including a rotor blade main body composed of a titanium alloy, the method comprising:
forming a deposition layer at a tip end portion of the rotor blade main body by using a first electrode composed of a first molded body molded from a powder of a cobalt-chromium alloy or a nickel alloy, or the first molded body processed with a heat treatment, generating pulsing electric discharges between the tip end portion of the rotor blade main body and the first electrode in an electrically insulating liquid or gas, and welding a material of the first electrode or a reacting substance of the material of the first electrode on the tip end portion of the blade main body by means of energy of the electric discharges; and
forming an abrasive coating having abrasiveness at a blade pressure side of the deposition layer by using a second electrode composed of a solid body of Si, a second molded body molded from a powder of Si, or the second molded body processed with a heat treatment, generating pulsing electric discharges between the blade pressure side of the deposition layer and the second electrode in an electrically insulating oil, and welding a material of the second electrode or a reacting substance of the material of the second electrode on the blade pressure side of the deposition layer by means of energy of the electric discharges.

14. A production method of a titanium rotor blade including a rotor blade main body composed of a titanium alloy, the method comprising:
forming an abrasive coating having abrasiveness at a portion ranging from a blade pressure side to a leading end side of the rotor blade main body by using an electrode composed of a molded body molded from a mixed powder including a powder of a metal and a powder of a ceramic or a powder of an electrically conductive ceramic, or the electrode processed with a heat treatment, generating pulsing electric discharges between the portion ranging from the blade pressure side to the leading end side of the rotor blade main body and the electrode in an electrically insulating liquid or gas, and welding a material of the electrode or a reacting substance of the material of the electrode on the portion ranging from the blade pressure side to the leading end side of the rotor blade main body by means of energy of the electric discharges.

15. A production method of a titanium rotor blade including a rotor blade main body composed of a titanium alloy, the method comprising:

forming an abrasive coating having abrasiveness formed at a portion ranging from a blade pressure side to a leading end side of the rotor blade main body by using an electrode composed of a solid body of Si, a molded body molded from a powder of Si, or the molded body processed with a heat treatment, generating pulsing electric discharges between the portion ranging from the blade pressure side to the leading end side of the rotor blade main body and the electrode in an electrically insulating oil, and welding a material of the electrode or a reacting substance of the material of the electrode on the portion ranging from the blade pressure side to the leading end side of the rotor blade main body by means of energy of the electric discharges.

16. A production method of a titanium rotor blade including a rotor blade main body composed of a titanium alloy, the method comprising:

forming a deposition layer at a tip end portion of the rotor blade main body by using a first electrode composed of a first molded body molded from a powder of a cobalt-chromium alloy or a nickel alloy, or the first molded body processed with a heat treatment, generating pulsing electric discharges between the tip end portion of the rotor blade main body and the first electrode in an electrically insulating liquid or gas, and welding a material of the first electrode or a reacting substance of the material of the first electrode on the tip end portion of the blade main body by means of energy of the electric discharges; and forming an abrasive coating having abrasiveness at a blade pressure side of the deposition layer by using a second electrode composed of a second molded body molded from a mixed powder including a powder of a metal and a powder of a ceramic or the second electrode processed with a heat treatment, generating pulsing electric discharges between the blade pressure side of the deposition layer and the second electrode in an electrically insulating liquid or gas, and welding a material of the second electrode or a reacting substance of the material of the second electrode on the blade pressure side of the deposition layer by means of energy of the electric discharges.

* * * * *